United States Patent [19]
Roberts, Jr. et al.

[11] Patent Number: 5,185,605
[45] Date of Patent: Feb. 9, 1993

[54] DIVE PROFILE RECORDER

[76] Inventors: James W. Roberts, Jr., 2005 Cheltenham Blvd., Greensboro, N.C. 27407; James P. Hollen, 114 Pine St., Thomasville, N.C. 27360

[21] Appl. No.: 788,818

[22] Filed: Nov. 7, 1991

[51] Int. Cl.$^5$ ............................................. H04B 13/02
[52] U.S. Cl. .................................. 340/850; 367/910; 367/134; 367/137
[58] Field of Search ................ 340/850; 367/910, 131, 367/134, 137, 115

[56] References Cited

U.S. PATENT DOCUMENTS

| | | | |
|---|---|---|---|
| 3,172,076 | 3/1965 | Alinari | 367/132 |
| 3,341,808 | 12/1967 | Levin et al. | 367/132 |
| 4,276,623 | 6/1981 | Abbott | 367/132 |
| 4,336,537 | 6/1982 | Strickland | 367/132 |
| 4,422,166 | 12/1983 | Klein | 367/115 |
| 4,432,079 | 2/1984 | Mackelburg et al. | 367/132 |
| 4,563,758 | 1/1986 | Paternostro | 367/132 |
| 4,820,953 | 4/1989 | Saubolle et al. | 367/132 |
| 4,949,072 | 9/1990 | Comerford et al. | 367/910 |
| 5,018,114 | 5/1991 | Mackelburg et al. | 367/134 |

OTHER PUBLICATIONS

Literature (Ocean Technology Systems) Oct. 1988.
"Underwater U.S.A." Magazine, p. 46 Aug. 1991.
"Designfax", p. 30, Jun. 1991.

Primary Examiner—J. Woodrow Eldred
Attorney, Agent, or Firm—Rhodes, Coats & Bennett

[57] ABSTRACT

A dive profile recorder for monitoring conditions encountered by a diver under water includes a plurality of transducers to be carried by a diver for generating electrical signals representative of the conditions encountered by the diver. Encoding circuitry electrically connected to the transducers encodes the electrical signals to form a serial data stream and a transmitter electrically connected to the encoding circuitry transmits the serial data stream through the water. A receiver remote from the diver receives the transmitted serial data stream and decoding circuitry electrically connected to the receiver decodes the serial data stream to electrical signals representative of the conditions encountered by the diver. A display electrically connected to the decoding circuitry receives the electrical signals and displays human-perceptible indicia of the conditions encountered by the diver in response to the received electrical signals.

12 Claims, 5 Drawing Sheets

DIVE PROFILE RECORDER

BACKGROUND OF THE INVENTION

The present invention relates to improvements in monitoring equipment for scuba divers. Scuba divers can swim to considerable depths and stay for long periods of time because they are provided with pressurized air tanks to supply air for breathing.

However, humans did not evolve as underwater creatures and therefore are not anatomically nor physiologically equipped to deal with certain hazards which are presented in diving. For example, diving in cold water can expose a diver to hypothermia, so divers typically wear wetsuits to protect them from the cold. Nonetheless, excessively cold water can still induce hypothermia.

Also, the supply of air to the diver in the tank is finite, limiting the time the diver can spend in the water. Moreover, the breathing of the compressed air at a substantial depth causes the dissolution of nitrogen in the air into the diver's blood. If this takes place over an extended period of time, the dissolved nitrogen reaches a level such that, upon decompressing, the nitrogen forms bubbles in the blood stream which can be excruciatingly painful and even lead to diver death. The dissolution of the nitrogen in the blood stream and the resultant bubble formation is known as "the bends". Prevention of the bends is accomplished by limiting the period of time at which a diver stays at excessive depths. Treatment is accomplished by having the ascent from excessive depths be gradual, to decrease the concentration of nitrogen in the bloodstream decreases gradually, so the nitrogen can be evolved gradually.

When decompression is required, the ascent from the maximum depth must begin early enough so that the diver has sufficient time to slowly ascend before the air in his tank is depleted.

Typically, diving in deep water takes place from a boat and one or more persons stays in the boat to assist in the event of an emergency below. Typically, the boat person has a signalling means to the diver to signal the diver when to begin his ascent in the event the diver has not already done so. However, up till now, the boat person has not had a convenient means to know the depth to which the diver has dived to be able to determine how quickly the ascent must be initiated to provide sufficient time for decompression. Also, the period of time required for decompression is determined largely by the depth to which the diver descends, so that the boat person needs to know not only how long the diver has been down, but how far down the diver has been and for how long at various depths. Moreover, in the event that the diver encounters other hazards, such as excessively cold water or perhaps becomes trapped beneath a ledge or within a submerged structure, the boat person needs to have some indication of this.

The present devices which permit a boat person to assist a diver simply do not provide the boat person with enough information to be of meaningful assistance to the diver to signal when to ascend or otherwise to treat a diver who may have ascended too quickly and be subject to the bends.

Accordingly, there is a need in the art for a diver monitor and process which will permit a boat person to follow parameters of the diver's dive.

SUMMARY OF THE INVENTION

The present invention fulfills this need in the art by providing a dive profile recorder for monitoring conditions encountered by a diver under water including a plurality of transducers to be carried by a diver for generating electrical signals representative of the conditions encountered by the diver, encoding circuitry electrically connected to the transducers for encoding the electrical signals to form a serial data stream and a transmitter electrically connected to the encoding circuitry to transmit the serial data stream through the water. A receiver remote from the diver receives the transmitted serial data stream transmitted from the transmitter, and decoding circuitry electrically connected to the receiver decodes the serial data stream to electrical signals representative of the conditions encountered by the diver. A display electrically connected to the decoding circuitry receives the electrical signals and displays human-perceptible indicia of the conditions encountered by the diver in response to the received electrical signals.

Preferably, the display includes a strip chart recorder including a strip of paper on which data is recorded and displays the water pressure (or depth, as desired) at the diver's depth on the paper. The conversion can be very readily made using the conversion formula of $$\text{depth (in feet)} = \text{pressure (in pounds)}/0.45 \text{ lb/ft.}$$

Generally, the diver will be wearing a pressurized air tank, and one of the transducers generates electrical signals representative of the pressure in the tank. Another indicates the pressure of the water at the diver's depth, and a third detects the water temperature. The displays display the air tank pressure, the water pressure and the water temperature.

In one embodiment the transmitter transmits the serial data stream through the water acoustically.

Preferably, the encoding circuitry converts analog signals to digital signals and converts parallel ones of the digital signals to the serial data stream. In a preferred embodiment, the encoding circuitry converts the parallel signals to a sequence of bytes including a start-byte, a plurality of bits representative of the digital signals and a checksum byte determined by the previous bits in the sequence.

Desirably, the decoding circuitry receives a sequence of bytes from the receiver and stacks the received bytes in a register of bytes having as many byte positions as the sequence of bytes and repeatedly evaluates the data in one of the byte positions. When the data in the one byte position of the register evaluates to be the same as the start byte, the decoding circuitry examines the data in the previous register bytes and determines a computed checksum byte. The circuitry compares the computed checksum byte to the received checksum byte (which follows the data bits in the register). If they are equal, the circuitry transfers the data out of the previous register bytes as the electrical signals to the display. The display continues to display received data until updated with fresh, successfully decoded electrical signals.

The invention also provides a method of monitoring conditions encountered by a diver under water including detecting conditions encountered by the diver and generating electrical signals representative of the conditions encountered by the diver, encoding the electrical signals to form a serial data stream and transmitting the serial data stream through the water. The method continues by receiving the transmitted serial data stream transmitted from the transmitter remotely from the diver, decoding the serial data stream to electrical signals representative of the conditions encountered by the diver and displaying human-perceptible indicia of the conditions being encountered by the diver as determined by the electrical signals.

Generally, the diver is wearing a pressurized air tank, and if so, the detecting step preferably includes generating electrical signals representative of the pressure in the tank. Other signals are generated representative of the pressure of the water at the depth of the diver and the water temperature. Desirably, the detected values of the air tank pressure, the water pressure and the water temperature are displayed in the displaying step. Preferably, the displaying step includes displaying the water pressure on paper on a strip chart recorder.

Preferably, the transmitting step includes transmitting the serial data stream through the water acoustically. Also preferably, the encoding step includes converting analog signals to digital signals and converting parallel ones of the digital signals to the serial data stream. Further, the encoding step preferably includes converting the parallel signals to a sequence of bytes including a start-byte, a plurality of bits representative of the digital signals and a checksum byte determined by the previous bits in the sequence.

Desirably, the decoding step includes stacking the received bytes in a register of bytes having as many byte positions as the sequence of bytes and repeatedly evaluating the data in one of the byte positions. When the data in the one byte position of the register evaluates to be the same as the start byte, the data in the previous register bytes is examined and a computed checksum byte is determined. The computed checksum byte is compared to the received checksum byte, and if they are equal, the data in the previous register bytes is transferred out to the displaying step as electrical signals. In a preferred embodiment the displaying step includes continually displaying received data until fresh, successfully decoded electrical signals are transferred out the register.

BRIEF DESCRIPTION OF THE DRAWINGS

The invention will be better understood after a reading of the detailed description of the preferred embodiment along with a study of the drawings in which.

DETAILED DESCRIPTION OF A PREFERRED EMBODIMENT OF THE INVENTION

Figure 1:
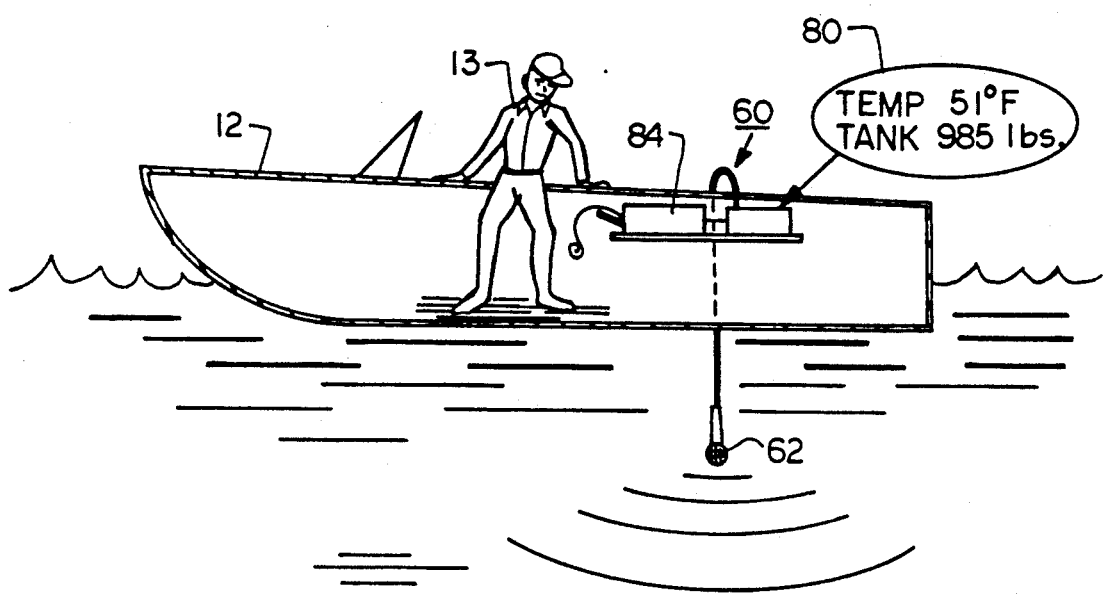
FIG. 1 is a perspective view of a boat on a water surface, and a diver below using an embodiment of the present invention.
Figure 1:
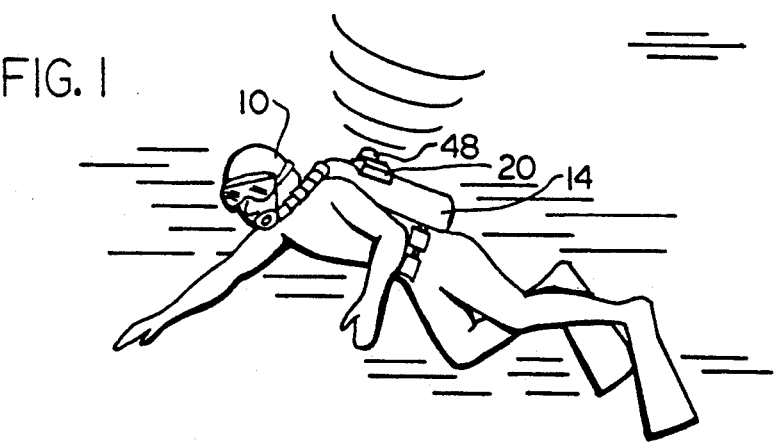

As can be seen in FIG. 1, the present invention provides monitoring apparatus and process to permit the conditions to which a diver 10 is exposed under water to be displayed in a boat 12 above him. Of course, the remote monitoring can be on the end of the pier or in some other out-of-the-water location.

The transmitter housing 20 carried by the diver 10 includes transducers which measure the pressure of the air tank 14 carrying the breathing supply to the diver 10. It also has transducers to measure the ambient water temperature and ambient water pressure. Electronics in the box 20 converts the detected signals to a transmittable form, and the transmitted information emanates from a transmitter 48. A receiver 62 carried by the boat 12 picks up the transmitted signals and applies them to the receiver electronics 60. The electronics 60 outputs the received information into a form that can be viewed by the boat person 13. In a particularly preferred embodiment, the water pressure (or its correlate, the diver's depth) is displayed on a strip chart recorder 84 so that the resultant paper strip chart shows the diver's depth as a graph correlated with the period of time of the dive. In that way, the depth and time can be combined to determine the amount of decompression which the diver 10 needs before resurfacing.

In addition, a readout such as a liquid crystal display 80 shows to the boat person 13 the water temperature to which the diver 10 is exposed as well as the remaining pressure in his tank 14.

Figure 2:
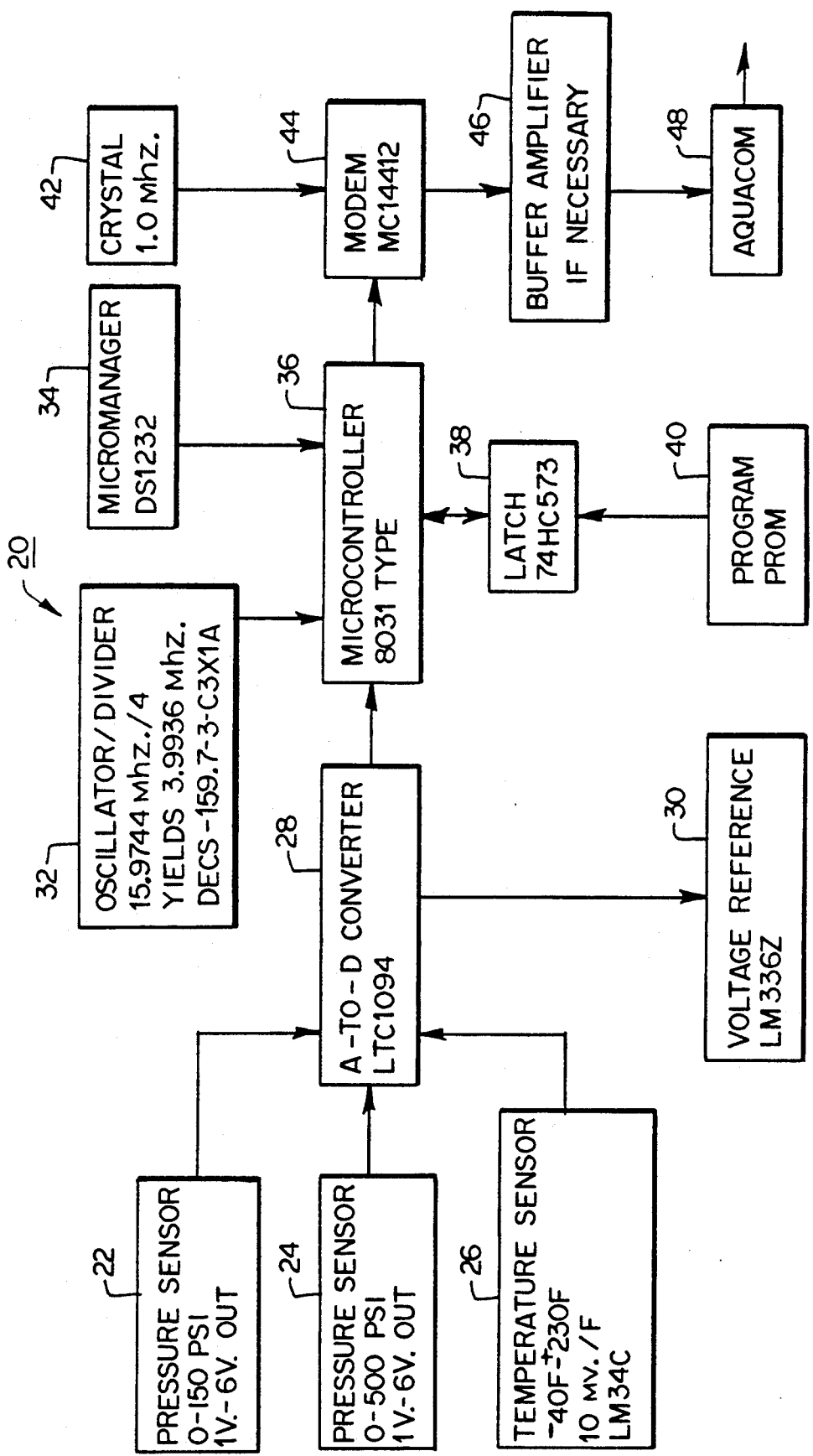
FIG. 2 is a block diagram of a transmitter circuit to be carried by the diver.

The circuitry in the housing 20 will be described with reference to FIG. 2. Three transducers 22,24,26 are typically provided, although additional transducers generating additional data can be added, if desired. Transducer 22 measures the ambient water pressure, typically in a range of 0–150 lbs/sq. in. and generates a voltage output of 1–6 volts. Transducer 24 measures the air pressure in the tank 14, typically in a range of 0–5,000 lbs./sq. in. and generates a voltage output of 1–6 volts. Transducer 26 measures the temperature of the ambient water, typically in a range of −40 to +230 degrees Fahrenheit and outputs a voltage of 10 millivolts per degree Fahrenheit.

The outputs of the three transducers are applied to an analog to digital converter 28 which operates from the basis of a voltage reference circuit 30. The analog to digital converter 28 converts the analog voltage to a digital form and supplies this data to microcontroller 36. Microcontroller 36 receives an oscillator signal from oscillator/divider 32 for a clock rate of 3.9936 megahertz. The microcontroller 36 operates under an instruction set stored in program PROM 40 accessed in a latch 38. A micro manager chip 34 initializes values in the microcontroller 36 and other components.

The microcontroller 36 encodes the data from the analog to digital converter 28 under the control of the program in PROM 40 and outputs the encoded data into a modem 44 operating under a 1.0 megahertz signal from crystal 42. The modem modulates the data into a form which can be handled by the transmitter 48. A buffer amplifier 46 may be interposed between the modem and transmitter 48, if necessary.

Figure 3:
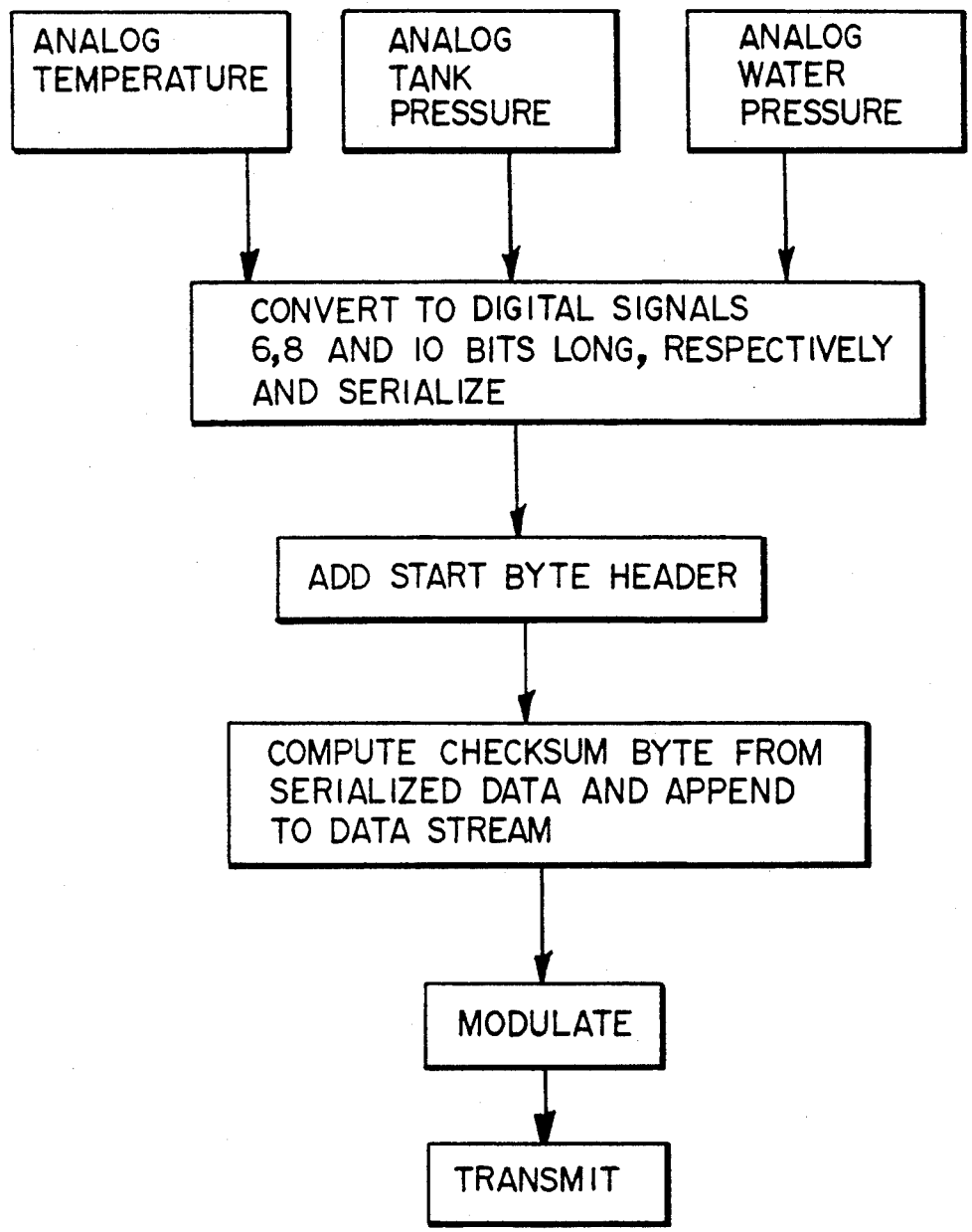
FIG. 3 is a flow chart of the operation of the transmitter circuit carried by the diver.

The instructions to the microcontroller 36 cause it to operate according to the flow chart in FIG. 3. Thus, the three analog signals, having been converted to digital form in analog to digital converter 28 are converted into data strings 6, 8 and 10 bits long. The 6-bit string is representative of the temperature, the 10-bit string representative of the tank pressure, and the 8-bit string representative of the water pressure, the longer bit strings indicating the greater importance of data precision. The three strings together from 24 bits, corresponding to three bytes in an 8-bit data system. The microcontroller serializes the three bytes and adds a standard start-byte header. The microcontroller also computes a checksum byte from the serialized data and, if desired, from the start byte header, according to a preset algorithm. The checksum byte is then appended at the end of the three data bytes to make a 5-byte long data stream consisting of the header, three bytes of data, and a checksum byte. The 5-bytes are applied to the modem 44 for modulation and then transmitted by the transmitter 48.

One transmitter which has been found to be suitable is the Aquacom SSB-2000 (or Model SSB-1000D) single side-band diver communication acoustic phone, manufactured and sold by Undersea Systems International, Inc. d/b/a/ Ocean Technology Systems, 2610 Croddy Way, Unit H, Santa Ana, Calif. 92704. The Aquacom transmitter is devised as a voice transmitter system to transmit voice signals from one diver to another. It does so by providing acoustic transmissions through the water at a frequency of 25 kilohertz.

The power supply to the underwater unit can be in the form of high capacity rechargeable D batteries and power supply regulators or any other suitable power supply.

Figure 4:
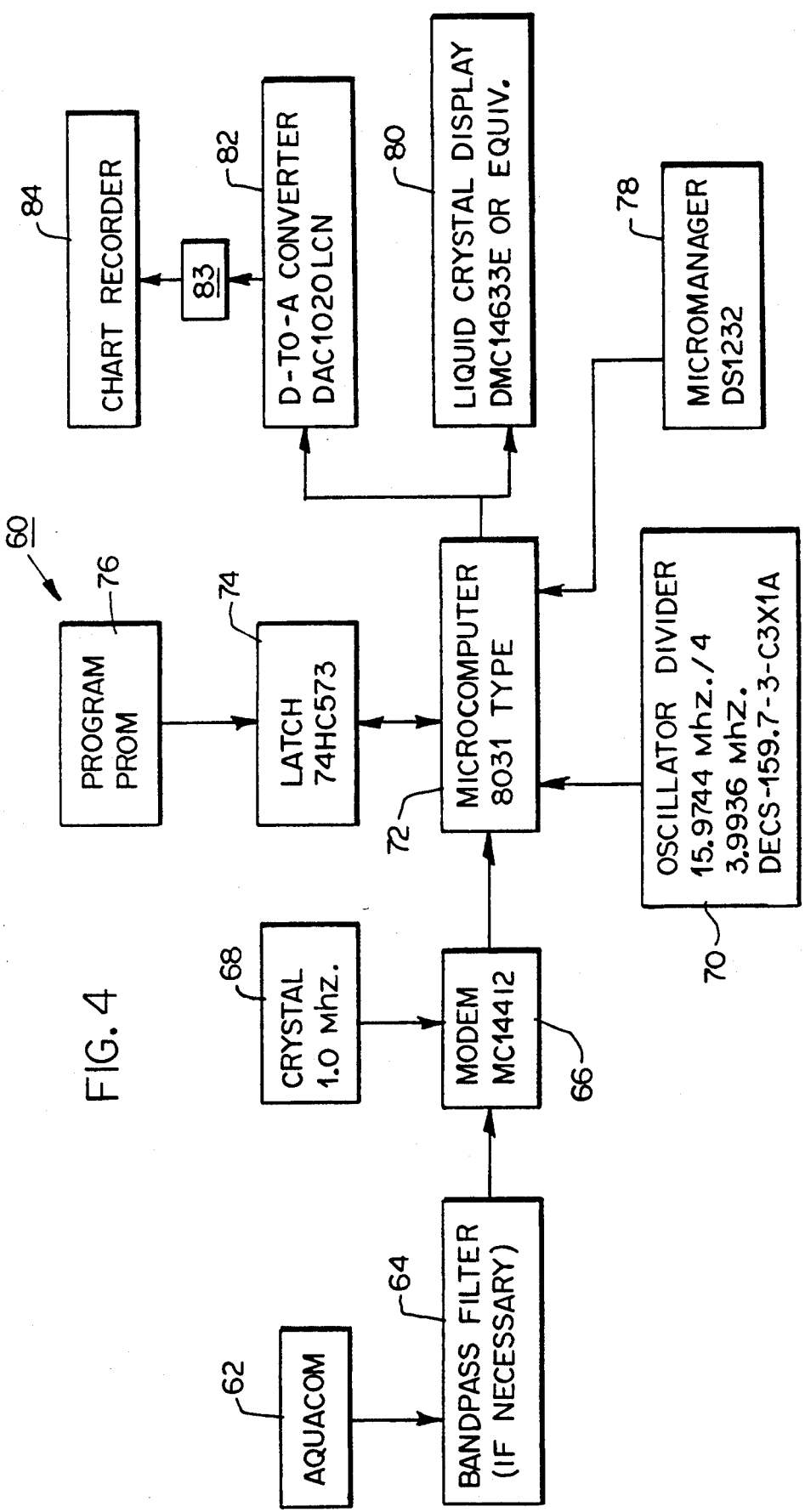
FIG. 4 is a block diagram of the receiver circuit mounted on the boat.
Figure 5:
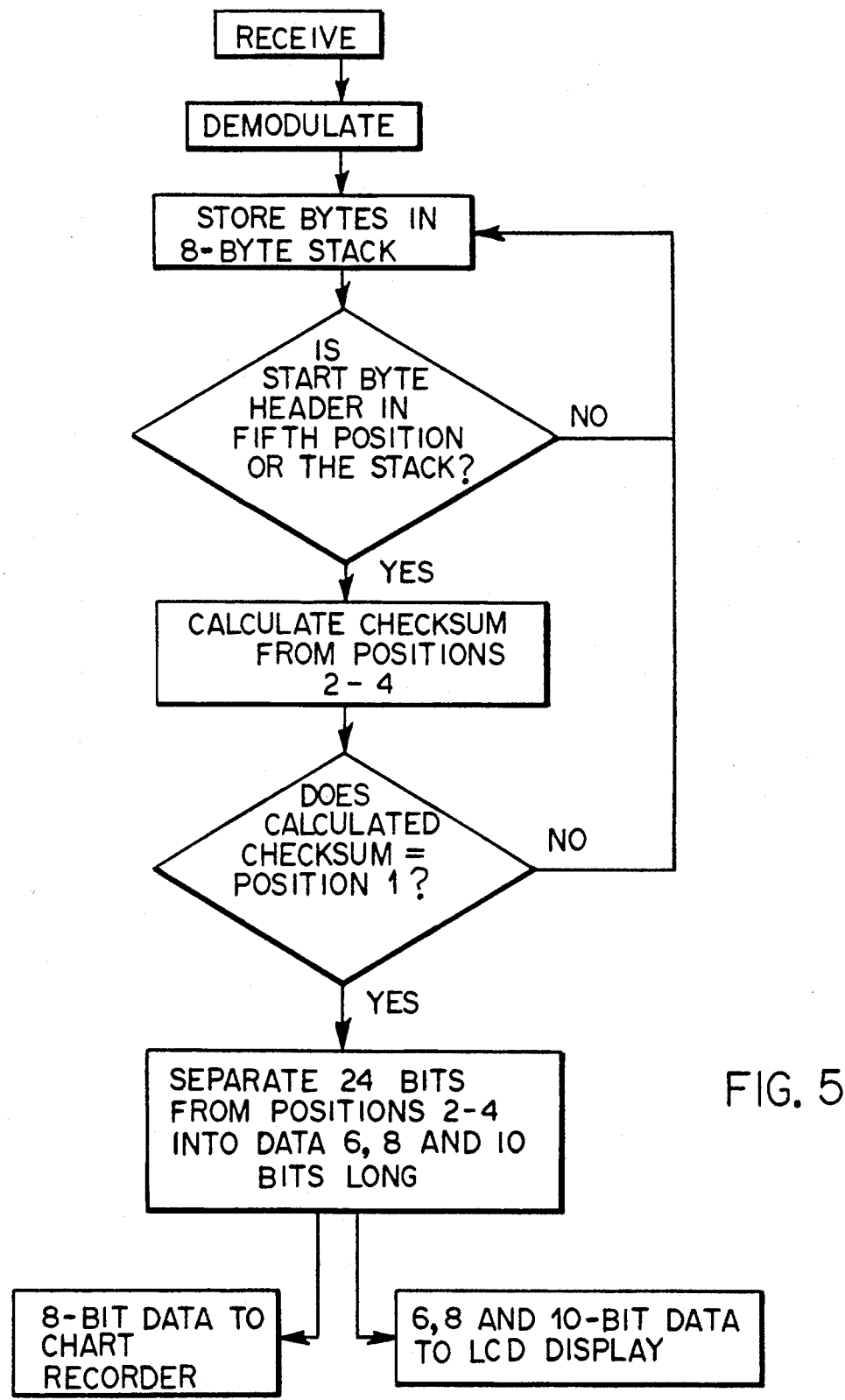
FIG. 5 is a flow chart of the operation of the receiver circuit.

The transmitted signal is received and processed using the circuit shown in FIG. 4 and operating under the flow chart shown in FIG. 5. A preferred receiver 62 is an Aquacom receiver, matched to operate with the Aquacom transmitter 48. The output of the receiver 62 passes through a band pass filter 64, if necessary, and is applied to a modem 66 for demodulation, operating under a 1.0 megahertz signal from crystal 68. The demodulated signal is applied to microcontroller 72, again operating from an oscillator/divider 70 at a clock rate of 3.9936 megahertz. Also, as with the transmitter, a micro manager 78 assists in initializing the value for the operation of the microcontroller 72. Also, as in the transmitter, the program for operation of the microcontroller 72 is stored in a program PROM 76 interfacing through a latch 74. The microcontroller 72 decodes the signal received from the modem 66 and applies it to a peripheral bus for display of data on a liquid crystal display 80 and through a digital to analog converter 82 onto a chart recorder 84.

The circuitry transfers data at a rate of 100 bits per second as required by the Aquacom transmitter, which is extremely slow considering the four megahertz clock operation of the microcontroller. This slow operation provides plenty of time for the checksum computations and comparisons, but yet is fast enough to provide the boat person with quite up-to-date data. The 4 mhz clock is also relatively slow in comparison with many electronic circuits, but is fast enough to perform all of the necessary computations within the 100 bit/sec data transmission rate and helps minimize power consumption.

The micro manager 78 instructs the serial port of the microcontroller 72 of the receiver to look for a 100 bit per second data rate and tells the microcontroller to detect a serial port interrupt and put the following data stream on the stack.

As seen in FIG. 5, the received and demodulated signal is stored in a stack of 8-bit bytes in the microcontroller 72. As each new byte of data arrives, the bytes progress in the stack. The microcontroller continually interrogates the fifth position of the stack to see if the contents is the same as the start byte. If it is, the data stored in positions 2-4 is examined and a checksum is calculated using the same algorithm used in the transmitter. The calculated checksum is compared with the data stored in position 1 of the stack to see if they are equal. If not, the microcontroller continues to await the receipt of additional data.

If so, the three bytes from the positions 2-4 are broken out into data strings 6, 8 and 10 bits long, corresponding to the data as encoded in the transmitter. The 8-bit string is sent to the digital-to-analog converter 82 for display on a chart recorder 84 indicative of the depth or its correlate, the water pressure at the depth of the diver. Multipler 83 is interposed between the converter 82 and the chart recorder 84 to change the analog voltage corresponding to the pressure to the appropriate voltage for accurate representation of the depth (preferably in feet) on the chart recorder. The 6- and 10-bit strings are applied to the liquid crystal display 80 to display the ambient water temperature and remaining tank pressure. If desired, the 8-bit string may also be applied to the LCD to display water pressure or depth. By this mode of operation of the microcontroller, the data supplied to the chart recorder and the LCD display continue until updated by freshly decoded data. Thus, if for some reason, data transmission is stopped, the values will not change and the boat person 13 can ascertain from the lack of change in any value that data transmission has stopped. One reason for data transmission to stop would be that the diver has gone under a ledge or into a submerged vessel, blocking the transmission from the transmitter 48 to the receiver 62. If desired, an alarm circuit can be added to the receiver electronics to indicate an alarm if the values have not changed during a substantial interval.

The boat person can readily monitor the chart recorder 84 to determine the time and pressure to which the diver has been exposed to signal the diver when to start his ascent. Also, the diver can use the chart recorder after completing his dive to determine when it is safe for him to dive again, according to the well-known diver decompression principles.

If desired, the water temperature and tank pressure can also be recorded on the chart recorder, and other data, including perhaps data monitoring the physiological condition of the diver himself, can be included in the monitored data. The addition of additional transducers merely increases the number of bytes of data to be encoded and transmitted, but the same coding methodology can be used.

Other transducers can be used, including a 30 millivolt pressure transducer which is quite inexpensive, although it would be necessary to amplify the output of such a low voltage transducer.

If desired, the data to the liquid crystal display can be preceded by additional data, such as a prefix "The temperature is" or "The tank pressure is".

The following table sets forth desired chip designations and sources for the circuit components:

| Parts Table | | | |
|---|---|---|---|
| Drawing Ref. No. | Part No. | Description | Manufacturer |
| 28 | LTC 1094 | | Linear Technology Corp. |
| 30 | LM 336Z | Voltage Ref. | National Semiconductor |
| 32, 70 | OECS-159.7-3-C3X1A | | Digikey |
| 34, 78 | DS 1232 | | Dallas Semiconductor |
| 36, 72 | 80C31 | Microcontroller | Several |
| 38, 74 | 74HC 573 | Address Latch | Several |

| Parts Table | | | |
|---|---|---|---|
| Drawing Ref. No. | Part No. | Description | Manufacturer |
| 40 | 2764 (or 27C64) | Program ROM | Several |
| 44, 66 | MC 14412 | 300 baud modem | Motorola |
| 48, 62 | | | Aquacom |
| 80 | DMC 14633E | LCD | Optrex |
| 82 | DAC 1020 LCN | | National Semiconductor |

Those of ordinary skill in the art will devise various modifications to the invention as described hereinabove without falling outside the scope of the invention.

What is claimed is:

1. A dive profile recorder for monitoring conditions encountered by a diver under water comprising:
    a. a plurality of transducers to be carried by a diver for generating analog electrical signals representative of the conditions encountered by the diver;
    b. an encoding circuitry electrically connected to said transducers for encoding the analog electrical signals to form a serial data stream, wherein said encoding circuitry converts the generated analog signals to digital signals and converts parallel digital signals to a sequence of bytes including a start-byte, a plurality of bits representative of the digital signals and a checksum byte determined by the previous bits in the sequence, and wherein the sequence of bytes form the serial data stream;
    c. a transmitter electrically connected to said encoding circuitry to transmit the serial data stream through the water;
    d. a receiver remote from the diver to receive the transmitted serial data stream transmitted from the transmitter;
    e. a decoding circuitry electrically connected to said receiver to decode the serial data stream to electrical signals representative of the conditions encountered by the diver, wherein said decoding circuitry;
        1. receives a sequence of bytes from said receiver,
        2. stacks the received bytes in a register of bytes having as many byte positions as the sequence of bytes,
        3. repeatedly evaluates the data in one of the byte positions and when the data in the one byte position of the register evaluates to be the same as the start-byte,
            a. examines the data in the previous register bytes and determines a computed checksum byte,
            b. compares the computed checksum byte to the received checksum byte, and if they are equal, transfers the data out of the previous register bytes
    a display electrically connected to said decoding circuitry to receive the electrical signals to display human-perceptible indicia of the conditions encountered by the driver in response to the received electrical signals.

2. A dive profile recorder as claimed in claim 1 wherein said display includes a strip chart recorder including a strip of paper on which data is recorded and displays the data correlated with dive depth on the paper.

3. A dive profile recorder as claimed in claim 1 for use by a diver wearing a pressurized air tank wherein said transducers generate electrical signals representative of the pressure in the air tank, the pressure of the water at the depth of the diver and the water temperature and wherein said displays display the air tank pressure, the depth of the water and the water temperature.

4. A dive profile recorder as claimed in claim 3 wherein said display includes a strip chart recorder including a strip of paper on which data is recorded and displays the dive depth on the paper.

5. A dive profile recorder as claimed in claim 1 wherein said transmitter transmits the serial data stream through the water acoustically.

6. A dive profile recorder as claimed in claim 1 wherein said display continues to display received data until updated with fresh, successfully decoded electrical signals.

7. A method of remotely monitoring conditions encountered by a diver under water comprising:
    a. detecting conditions encountered by the diver and generating electrical signals representative of the conditions encountered by the diver;
    b. encoding the electrical signals to form a serial data stream, including converting analog signals to digital signals and converting parallel digital signals to a sequence of bytes including a start-byte, a plurality of bits representative of the digital signals and a checksum byte determined by the previous bits in the sequence, and converting said sequence of bytes to the serial data stream;
    c. receiving remotely from the diver the transmitted serial data stream transmitted from the transmitter;
    d. decoding the serial data stream to electrical signals representative of the conditions encountered by the diver, wherein said decoding step includes:
        1. stacking the received bytes in a register of bytes having as many byte positions as the sequence of bytes,
        2. repeatedly evaluating the data in one of the byte positions and when the data in the one byte position of the register evaluates to be the same as the start byte,
            a. examining the data in the previous register bytes and determining a computed checksum byte,
            b. comparing the computed checksum byte to the received checksum byte, and if they are equal, transferring the data out of the previous register bytes to said displaying step as electrical signals; and
    e. displaying human-perceptible indicia of the conditions encountered by the diver as determined by the electrical signals.

8. A method of remotely monitoring conditions encountered by a diver under water as claimed in claim 7 wherein said displaying step includes displaying the depth of the water on paper on a strip chart recorder.

9. A method of remotely monitoring conditions encountered by a diver under water as claimed in claim 7 in which the diver is wearing a pressurized air tank and the detecting step includes generating electrical signals representative of the pressure in the tank, the pressure of the water at the depth of the diver and the water temperature and wherein said displaying step includes displaying the air tank pressure, the depth of the water and the water temperature.

10. A method of remotely monitoring conditions encountered by a diver under water as claimed in claim 9 wherein said displaying step includes displaying the depth of the water on a strip of paper on a strip chart recorder.

11. A method of remotely monitoring conditions encountered by a diver under water as claimed in claim 7 wherein said transmitting step includes transmitting the serial data stream through the water acoustically.

12. A method of remotely monitoring conditions encountered by a diver under water as claim in claim 7 wherein said displaying step includes continually displaying received data until fresh, successfully decoded electrical signals is transferred out the register.

* * * * *